No. 839,574. PATENTED DEC. 25, 1906.
N. FRANZEN.
METHOD OF AND MACHINE FOR MAKING WIRE GLASS.
APPLICATION FILED JUNE 4, 1906.
2 SHEETS—SHEET 1.
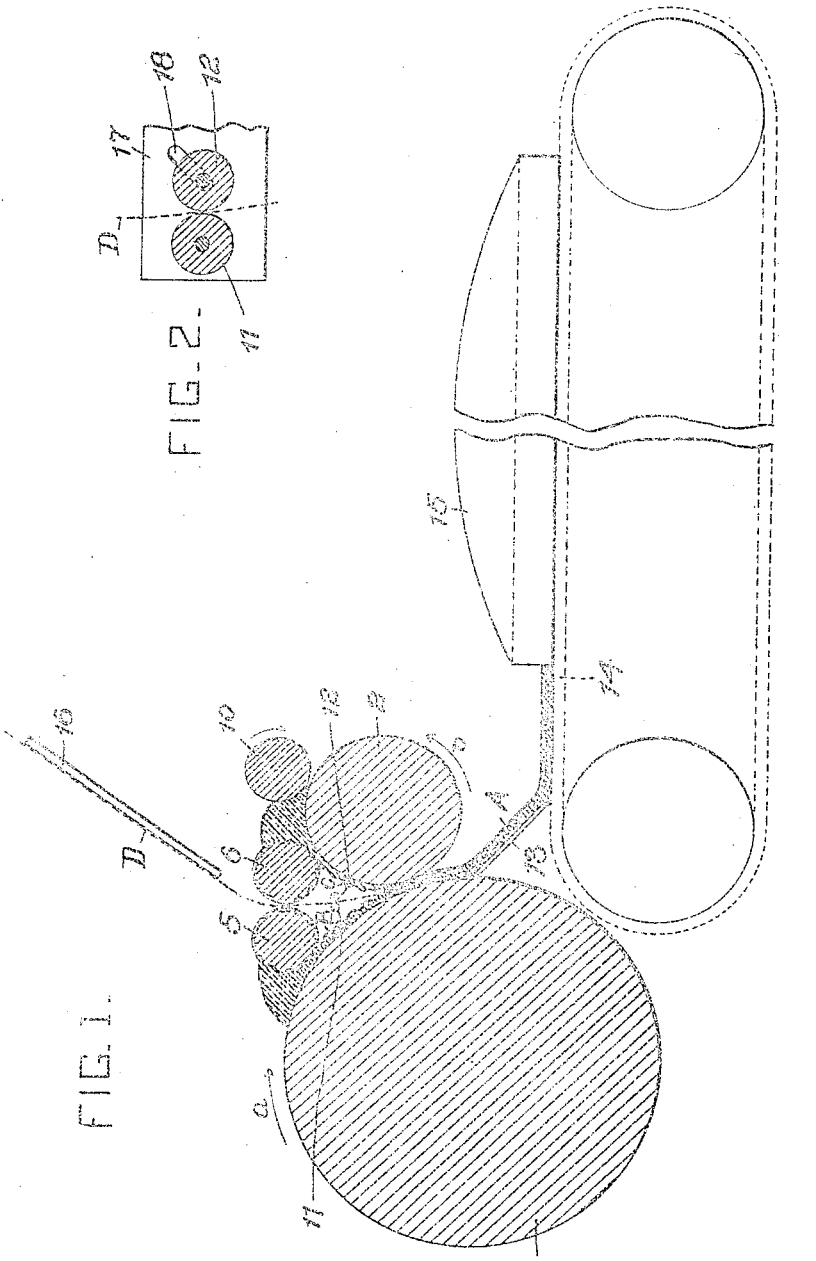

No. 839,574. PATENTED DEC. 25, 1906.
N. FRANZEN.
METHOD OF AND MACHINE FOR MAKING WIRE GLASS.
APPLICATION FILED JUNE 4, 1906.
2 SHEETS—SHEET 2.
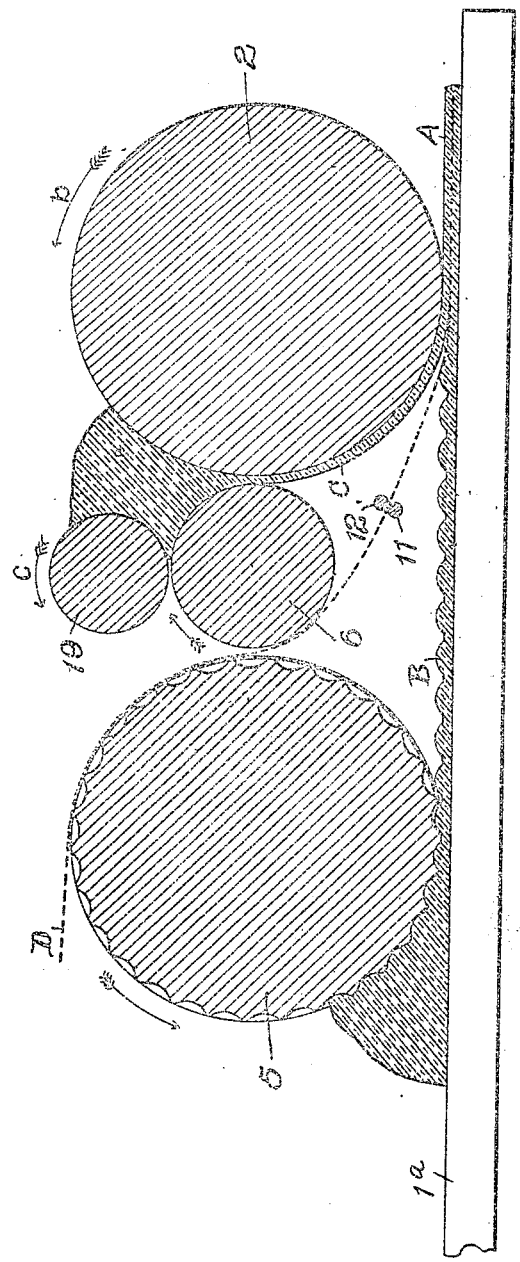
WITNESSES:
J. Herbert Bradley.
Wm. H. Wilson.
INVENTOR
Nicklas Franzen
by Christy and Christy
Atty's

UNITED STATES PATENT OFFICE.

NICKLAS FRANZEN, OF MONONGAHELA, PENNSYLVANIA, ASSIGNOR TO THE PITTSBURG PLATE GLASS COMPANY, OF PITTSBURG, PENNSYLVANIA, A CORPORATION OF PENNSYLVANIA.

METHOD OF AND MACHINE FOR MAKING WIRE-GLASS.

No. 839,374.

Specification of Letters Patent.

Patented Dec. 25, 1906.

Application filed June 4, 1906. Serial No. 320,074.

*To all whom it may concern:*

Be it known that I, NICKLAS FRANZEN, a citizen of the United States, residing at Monongahela, in the county of Washington and State of Pennsylvania, have invented or discovered certain new and useful Improvements in Methods of and Machines for Making Wire-Glass, of which improvements the following is a specification.

My invention relates to improvements in methods of and machines for making wire-glass; and the object of my improvement is to produce wire-glass of superior quality.

In the accompanying drawings, which form part of this specification, Figure 1 shows diagrammatically a machine which embodies and operates to carry out my present invention. In this view the parts are shown in vertical longitudinal section. Fig. 2 shows a detailed portion on larger scale, and Fig. 3 is a view in vertical longitudinal section of a machine of somewhat-different construction which also embodies my present invention in its broader aspect.

Referring to Fig. 1, a pair of rolls 1 and 2 are so spaced and arranged with respect to one another that, rotating in opposite directions, (indicated by the arrows $a$ and $b$,) they unite upon a fabric D, fed into the pass between them and into an integral sheet of wire glass A, two layers of glass B and C, previously spread upon their surfaces in the manner hereinafter explained. A pair of rolls 5 and 6 constitute means for spreading upon the surfaces of rolls 1 and 2 the layers of glass B and C. These rolls 5 and 6 are spaced and arranged relatively to rolls 1 and 2 to effect that end, and, further, they are preferably so arranged that each forms in conjunction with the roll upon which it spreads a layer a hopper-like receptacle wherein molten glass may be teemed and retained by gravity. The surfaces of rolls 5 and 6 are pitted—that is, in the surfaces of these rolls are formed a large number of pockets or recesses after the manner set forth in my application for Letters Patent, filed June 7, 1905, Serial No. 264,130. These pockets or recesses or culs-de-sac in the otherwise smooth surfaces of rolls 5 and 6 will when brought into contact with the molten glass in the manner presently to be described retain small quantities of entrapped air confined by the closure of the mouths of the openings with molten glass. Such entrapped air will form in each pocket insulation against the conduction of heat from the molten glass to the roll-body, preventing chilling contact at such point, and consequently the surface of the layer spread by the pitted roll upon the surface of roll 1 or 2 as it passes from beneath the spreading-roll will bear spots (portions of the surface corresponding in position to the pockets in the roll) of unhardened unchilled glass. It has heretofore been a difficulty in making wire-glass of separately-formed layers that the layers are chilled in their formation and that their subsequent union or weld is consequently imperfect. By virtue of these pitted rolls used as layer-spreading rolls the layers, bearing slight protuberances of soft or unchilled glass are intimately united and welded.

It will be understood that while rolls 5 and 6 may both be advantageously pitted in the manner and for the purpose described my invention will still be practiced if but one of these two rolls be so pitted.

It may be found convenient to make roll 2 smaller than roll 1, as shown in Fig. 1, and in that case an additional roll 10 may be employed to complete the hopper for the molten glass supplied to roll 2. Such roll will preferably be positively driven in the direction indicated by arrow $c$.

Roll 2 being in the machine illustrated smaller than roll 1, a chute 13 is introduced whereon the finished sheet A is directed laterally beneath roll 2 and delivered to a carrier 14, upon which it is borne to the annealing-oven, (shown at 15.)

The forming-surface, which in Fig. 1 appears as a roll 1, may be a casting-table 1$^a$, as shown in Fig. 3. With it the spreading-roll 5 coöperates as in the other case to spread molten glass to layer form, and upon it the two layers of glass B and C are united upon fabric D by roll 2. In this instance I have shown roll 5 alone provided with the pits already described. An additional roll 19 appears in this Fig. 3, and, like roll 10, it is employed to enlarge the hopper for molten glass to be spread between rolls 2 and 6.

Up to this point I have made no reference to the wire, and while it will be observed that the machine will produce plates of glass whether wire be introduced or not and that my invention is accordingly unlimited in that regard it remains the fact that the object is the introduction of wire and the production of wire-glass. The wire (indicated in the drawings at D) is introduced into the pass between rolls 1 and 2, where the surfaces of the rolls approach one another, each faced with a layer of glass. For present commercial purposes the wire D is in the form of a netting; but obviously it may be of any desired and practical material prepared in any desired manner, and I designate it "fabric," and mean to include not only woven wire fabric, but any substance thus suitable to be inlaid in glass, regardless of material and regardless of minute composition and shape.

A pair of rolls 11 and 12 may be provided for properly controlling the feed of the fabric into the machine. These rolls are, as shown, placed adjacent to the pass between rolls 1 and 2, (or between casting-table 1ª and roll 2,) so that the fabric will be delivered into the pass. The fabric D is supplied through the space between rolls 5 and 6. A chute 16 may be arranged to sustain the fabric while being carried into the machine. Rolls 11 and 12 are shown in detail in Fig. 2. They are carried in common supports or housings 17. One of them, 11, is immovable. The other, 12, is journaled in a slot 18, in which it is free to descend by gravity. By such arrangement the rolls 11 and 12 engage the fabric, and as the fabric descends and becomes heated by radiation from the proximate layers B and C and expands these rolls 11 and 12 hold the fabric back, keep it straight, and prevent buckling to one side or the other.

The advantage of expanding the wire by heat before its incorporation between layers B and C is obvious.

The operation of the parts will readily be understood from the foregoing description. Rolls 1 and 2 are suitably set to form the finished sheet, rolls 5 and 6 adjusted to rolls 1 and 2 to spread layers of desired thickness. The fabric D is made ready for introduction. Glass is teemed in two batches E and F to the passes between rolls 1 and 5, 2 and 6. Rolls 1 and 2 are then impelled in the directions indicated by arrows *a* and *b*. Thereupon the molten glass is spread to layers B and C, which rest upon rolls 1 and 2, and these layers supported upon the surfaces of these rolls approach the pass between them. The wire is brought down and caught in the pass between rolls 1 and 2, and the two layers B and C, on, or both having substantially unchilled surfaces, as already explained, are united and welded between rolls 1 and 2 through the fabric D into a finished sheet of wire-glass A. This finished sheet may be carried to the annealing-oven in such manner as is shown in the drawings.

I claim as my invention—

1. In a machine for making plate-glass the combination of a forming-surface, a pitted roll coöperating with such surface to spread molten glass to layer form thereon, and means for uniting to a layer of glass so spread upon said surface a second, independently-formed layer of glass, substantially as described.

2. In a machine for making plate-glass, the combination of a roll, a second pitted roll coöperating with the first to spread molten glass to layer form upon its surface, means for uniting to a layer of glass so spread upon said first-named roll, a second independently-formed layer of glass, substantially as described.

3. In a machine for making plate-glass, the combination of a pair of rolls rotating to unite into a single sheet layers of glass spread upon their several surfaces, and rolls coöperating with said first-named pair of rolls to spread molten glass to layer form thereon, the surfaces of said last-named rolls being pitted, substantially as described.

4. In a machine for making wire-glass the combination of a pair of rolls rotating to unite upon a fabric fed into the pass between them layers of glass spread upon their several surfaces, and rolls coöperating with said first-named pair of rolls to spread molten glass to layer form thereon, the surfaces of said spreading-rolls being pitted, substantially as described.

5. In a machine for making wire-glass, the combination of a forming-surface, a pitted roll coöperating with such surface to spread molten glass to layer form thereon, means for uniting to a layer of glass so spread upon said surface a second independently-formed layer of glass, and means for controlling the supply of fabric so arranged as to hold the fabric out of contact with either layer until the layers are brought into contact with one another on opposite sides of the fabric, substantially as described.

6. In a machine for making wire-glass, the combination of a forming-surface, a pitted roll coöperating with such forming-surface to spread molten glass to layer form thereon, means for uniting to a layer of glass so spread upon said surface a second independently-formed layer of glass, and a pair of rolls coöperating by gravity to engage a fabric and to control the supply of fabric to said layers as they are progressively united, substantially as described.

7. The method of making plate-glass described herein which consists in spreading a batch of molten glass to a layer bearing upon its surface protrusions of soft or unchilled glass, spreading a second batch of molten glass to layer form, and uniting the said layer upon the protrusion-bearing surface of the first-named layer.

8. The method of making wire-glass described herein which consists in spreading a batch of molten glass to a layer bearing upon its surface protrusions of soft or unchilled glass, spreading a second batch of glass to layer form, and uniting the said layer upon the protrusion-bearing surface of the first-named layer and through the meshes of a fabric.

In testimony whereof I have hereunto set my hand.

NICKLAS FRANZEN.

Witnesses:
   BAYARD H. CHRISTY,
   CHARLES BARNETT.